(12) United States Patent
Adachi et al.

(10) Patent No.: US 8,016,307 B2
(45) Date of Patent: Sep. 13, 2011

(54) FENDER SUPPORTING STRUCTURE OF TWO-WHEELED MOTOR VEHICLE

(75) Inventors: Eiji Adachi, Wako (JP); Yuichi Kato, Wako (JP); Daisuke Soeno, Wako (JP); Yuji Noguchi, Wako (JP); Tomohiro Fuse, Wako (JP); Kazuhito Hayashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 347 days.

(21) Appl. No.: 12/038,883

(22) Filed: Feb. 28, 2008

(65) Prior Publication Data

US 2009/0058066 A1 Mar. 5, 2009

(30) Foreign Application Priority Data

Mar. 2, 2007 (JP) ................................ 2007-052508

(51) Int. Cl.
*B62D 25/16* (2006.01)
(52) U.S. Cl. ...................... 280/152.1; 280/847; 280/854
(58) Field of Classification Search ............... 280/152.1, 280/152.2, 152.3, 159, 160, 160.1, 288.4, 280/304.3, 728.2, 847, 848, 851, 852, 854, 280/727; 180/218, 225; 293/105, 155
See application file for complete search history.

(56) References Cited

U.S. PATENT DOCUMENTS

| | | | | |
|---|---|---|---|---|
| 4,422,659 A * | 12/1983 | Nebu | .......................... | 280/152.1 |
| 4,620,713 A * | 11/1986 | Sakaguchi | .................. | 280/152.3 |
| 4,982,973 A * | 1/1991 | Saito et al. | .................. | 280/152.1 |
| 6,257,362 B1 * | 7/2001 | Scherbarth | .................... | 180/219 |
| 6,331,011 B1 * | 12/2001 | Feldmann et al. | .......... | 280/152.1 |
| 6,435,533 B1 * | 8/2002 | Chuang | ...................... | 280/152.1 |
| 6,634,664 B1 * | 10/2003 | Kojima | ....................... | 280/288.4 |
| 6,644,693 B2 * | 11/2003 | Michisaka et al. | ............. | 280/835 |
| 6,651,769 B2 * | 11/2003 | Laivins et al. | ................. | 180/229 |
| 6,702,311 B2 * | 3/2004 | Tsukiji | ......................... | 280/152.2 |
| 7,325,639 B2 * | 2/2008 | Yamaguchi et al. | ........... | 180/219 |
| 7,559,580 B2 * | 7/2009 | Ara jo | ............................ | 280/848 |
| 2002/0166709 A1 * | 11/2002 | Michisaka et al. | ............. | 180/219 |
| 2003/0047934 A1 * | 3/2003 | Tsukiji | ........................ | 280/847 |
| 2003/0121708 A1 * | 7/2003 | Laivins et al. | ................. | 180/229 |
| 2006/0000652 A1 * | 1/2006 | Yamaguchi et al. | .......... | 180/68.3 |
| 2006/0175790 A1 * | 8/2006 | Presby | ........................ | 280/152.1 |

(Continued)

FOREIGN PATENT DOCUMENTS

DE 202006012249 U1 11/2006

(Continued)

*Primary Examiner* — J. Allen Shriver, II
*Assistant Examiner* — Brodie Follman
(74) *Attorney, Agent, or Firm* — Westerman, Hattori, Daniels & Adrian, LLP

(57) ABSTRACT

A fender supporting structure of a two-wheeled motor vehicle capable of securing the rigidity of a mounting portion of a front fender and the rigidity of the entire front fender is provided, without enlarging the outer shape of the front fender more than necessary. In a fender supporting structure of a two-wheeled motor vehicle including a fender formed in an arc shape along the shape of a wheel, and a fender supporting member on which the fender is mounted from under the fender supporting member so as to cover an area above the wheel, at least two mounting surfaces at different levels in height are formed on the fender, at least two mounting surfaces at different levels in height are formed on the fender supporting member, and the fender is joined to the fender supporting member with these mounting surfaces.

10 Claims, 10 Drawing Sheets

U.S. PATENT DOCUMENTS

| | | | |
|---|---|---|---|
| 2008/0054585 A1* | 3/2008 | Konno et al. | 280/152.1 |
| 2008/0156558 A1* | 7/2008 | Otsubo et al. | 180/219 |
| 2009/0001705 A1* | 1/2009 | Fischer et al. | 280/854 |
| 2009/0079156 A1* | 3/2009 | Ichihara | 280/152.1 |
| 2009/0256345 A1* | 10/2009 | Tanaka et al. | 280/850 |

FOREIGN PATENT DOCUMENTS

| | | |
|---|---|---|
| JP | 2500984 Y2 | 3/1996 |

\* cited by examiner

US 8,016,307 B2

FENDER SUPPORTING STRUCTURE OF TWO-WHEELED MOTOR VEHICLE

TECHNICAL FIELD

The present invention relates to a fender supporting structure of a two wheeled motor vehicle for supporting a front fender covering an area above the front wheel.

BACKGROUND OF THE INVENTION

A front fender is provided above the front wheel of a two-wheeled motor vehicle, being formed in an arc shape so as to cover the front wheel. This front fender is made attachable from under a bottom bridge provided to a front fork. In addition, this front fork and a mounting surface of the bottom bridge are formed on the same level, and the front fender is attached to the bottom bridge with fastener members such as bolts inserted through a plurality of mounting holes formed in the mounting surface (for example, see Japanese Utility Model Registration No. 2500984).

Moreover, the front fender is integrally formed of synthetic resin. Accordingly, in order to secure the supporting rigidity at a mounting portion of the front fender to be attached to the bottom bridge, the dimension of the mounting surface of the front fender as long as possible in a width direction. Moreover, in order to secure the rigidity of the entire front fender, the entire shape of the front fender is enlarged to suit the dimension thereof in this width direction.

The front fender only has the function of preventing mud from splashing. However, an enlargement of the dimension of the front fender in the width direction requires the outer shape of the front fender to be made larger than necessary. As a result, this requirement narrows the range of the design and layout of the front fender.

The present invention has been made in consideration of the foregoing circumstances. An object of the present invention is to provide a fender supporting structure of a two-wheeled motor vehicle that is capable of securing the rigidity of a mounting portion of a front fender and the rigidity of the entire front fender, without enlarging the outer shape of the front fender more than necessary.

SUMMARY OF THE INVENTION

The present invention is characterized as a fender supporting structure of a two-wheeled motor vehicle including a fender formed in an arc shape along a shape of a wheel, and a fender supporting member on which the fender is mounted from under the fender supporting member so as to cover an area above the wheel. The fender supporting structure of a two-wheeled motor vehicle is characterized in that at least two mounting surfaces at different levels in height are formed on each of the fender and the fender supporting member; and that the fender is joined to the fender supporting member at these mounting surfaces.

With this configuration, the at least two mounting surfaces are used to join the fender and the fender supporting member. Thereby, the supporting rigidity of this mounting portion can be increased. Moreover, the bending strength at the mounting surfaces can also be increased.

In addition, the fender supporting member may be a bottom bridge attached to a front fork. With this configuration, the fender can be supported above the wheel.

Further, the at least two mounting surfaces may be disposed in different positions relative to a front and rear direction of the vehicle body. With this configuration, the rigidity of the fender supporting member in a width direction can be increased.

Furthermore, the fender supporting member may be provided with a cover member for covering the fender supporting member. With this configuration, the fender mounting portion can be concealed from the outside.

Moreover, a front face of the bottom bridge may be provided with a jutting portion, and one of the mounting surfaces of the fender may be supported by the jutting portion. With this configuration, supporting surfaces at different levels in height can be formed without a change in the shape of the bottom bridge, and accordingly the fender can be supported by these supporting surfaces.

According to the present invention, in a fender supporting structure of a two-wheeled motor vehicle including a fender formed in an arc shape along a shape of a wheel, and a fender supporting member on which the fender is mounted from under the fender supporting member so as to cover an area above the wheel, at least two mounting surfaces at different levels in height are formed on each of the fender and the fender supporting member; and the fender is joined to the fender supporting member with these mounting surfaces. Thus, the fender and the fender supporting member are joined together by use of the at least two mounting surfaces at the different levels in height. Accordingly, the supporting rigidity of this mounting portion can be increased. In addition, the bending strength at the mounting surfaces can also be increased. This makes it possible to increase the rigidity of the entire fender and the rigidity of the mounting portion of the fender, without enlarging the outer shape of the fender more than necessary. As a result, the flexibility in fender design and layout can be enhanced.

Moreover, by providing the cover member for concealing the fender supporting member, the mounting portion of the fender is concealed from the outside. Thus, the appearance of the two-wheeled motor vehicle can be made more attractive.

BRIEF DESCRIPTION OF THE DRAWINGS

The advantages of the invention will become apparent in the following description taken in conjunction with the drawings, wherein.

DETAILED DESCRIPTION OF THE INVENTION

Figure 1:
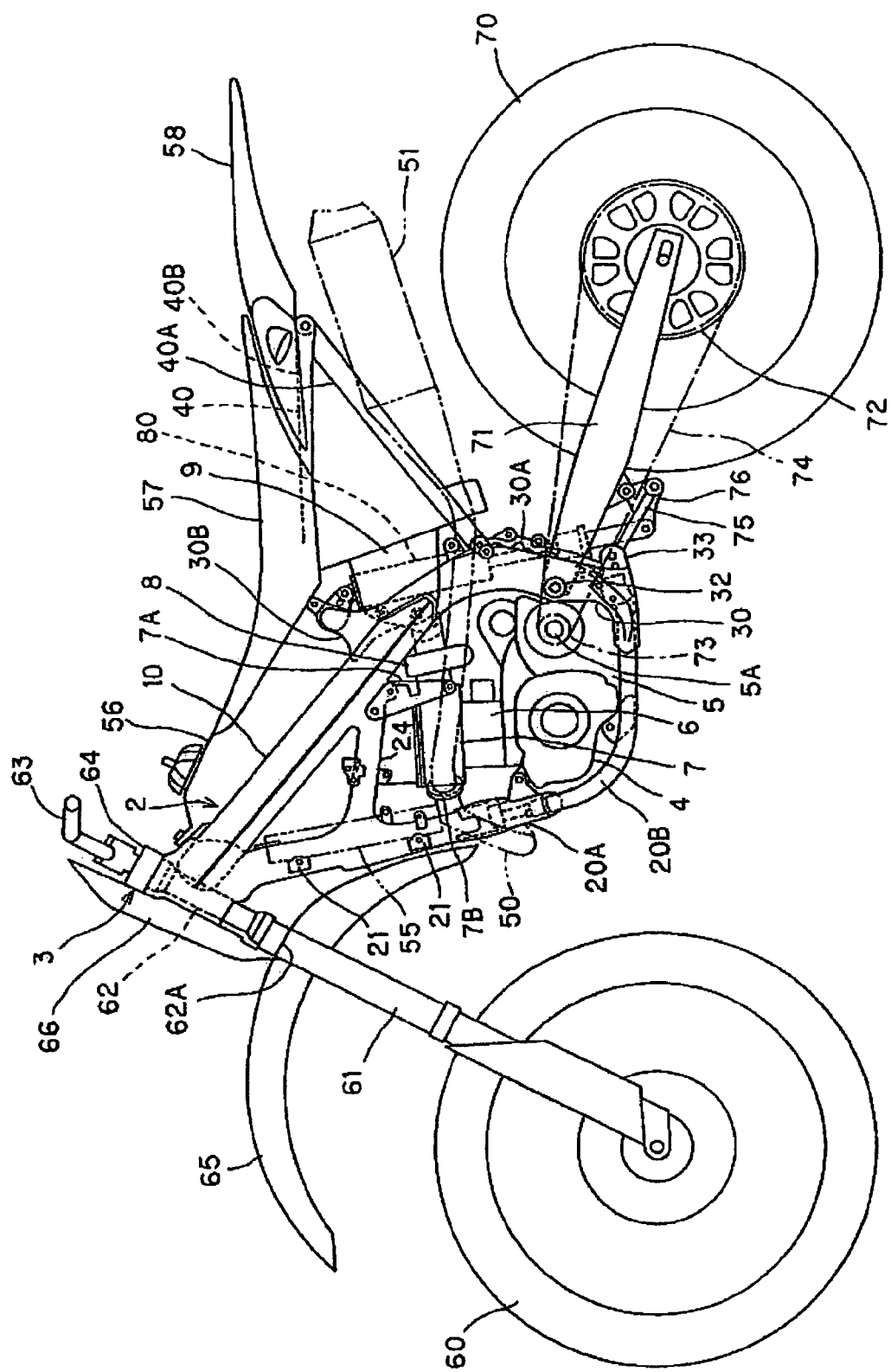
FIG. 1 is a left side view of a two-wheeled motor vehicle according to an embodiment of the present invention.

Hereinafter, a fender supporting structure of a two-wheeled motor vehicle according to an embodiment of the present invention will be described by referring to the drawings. FIG. 1 is a left side view of an off-road two-wheeled motor vehicle 1 according to the embodiment of the present invention. Note that directions used in the following description are based on FIG. 1. Precisely, the upper and lower directions of the vehicle body are the upper and lower directions in FIG. 1, the right and left directions of the vehicle body are depth directions relative to the paper surface of FIG. 1, and the front and rear directions of the vehicle body are the left and right directions on the paper surface of FIG. 1. Moreover, in FIG. 1, a side cover and a shroud covering the outer side of the vehicle body are omitted to simplify the description.

As shown in FIG. 1, a vehicle body frame 2 of the two-wheeled motor vehicle 1 includes a pair of right and left main frames 10, 10, a down tube 20A, a pair of right and left lower pipes 20B, 20B, and a pair of right and left center frames 30, 30. The left main frames 10, 10 each obliquely extend from a head pipe 3 to the rear and lower side of the vehicle body. The down tube 20A extends from the head pipe 3 to the lower side of the vehicle body under the main frames 10, 10. The lower pipes 20B, 20B are continuous from the lower side of this down tube 20A, and extend to the rear and lower side of the vehicle body. The center frames 30, 30 join the rear edges of the main frames 10, 10 to the rear edges of the lower pipes 20B, 20B, respectively. This vehicle body frame 2 constitutes a cradle type frame, and an engine 4 is suspended with an engine hanger in the inside surrounded by the vehicle body frame 2.

The down tube 20A is formed in a hollow structure having a rectangular cross section, and has the right and left side surfaces provided with bolt fastening portions 21 for fixing a radiator 55. The bolt fastening portions 21 are provided to be spaced apart from each other in an upper and lower direction. The back side of the down tube 20A is provided with a reinforcement frame 24, and each edge of the reinforcement frame 24 is connected to a head hanger bracket of the main frame 10.

Rear frames 40, 40 extending to the rear side of the vehicle body are attached to the center frames 30, 30. The rear frames 40, 40 are configured of pipes 40A, 40A and a pair of pipes 40B, 40B. The pipes 40A, 40A obliquely extend to the rear and upper side of the vehicle body from bent portions 30A, 30A located in a center portion in an upper and lower direction of the center frames 30, 30. The pipes 40B, 40B extend to the rear side of the vehicle body from the upper edges of brackets 30B, 30B provided to upper portions of the center frames 30, 30. The rear edges of these pipes 40A, 40A and 40B, 40B are respectively connected to each other. A seat 57, a rear fender 58 and an unillustrated side cover are attached to these pipes 40A and 40B.

A pivot 32 piercing the center frames 30, 30 in a right and left direction of the vehicle body is provided under the bent portions 30A, 30A of the center frames 30, 30. This pivot 32 supports the front edge of a swing arm 71 swingably in the upper and lower directions, and the swing arm 71 supports a rear wheel 70 via a shaft. In addition, a drive chain 74 is wrapped around both a sprocket 72 provided to the rear wheel 70 and a sprocket 73 provided to an output shaft 5A of the engine 4. A driving force of the engine 4 is transmitted to the rear wheel 70 via this drive chain 74.

In addition, a rod-bracket 33 is provided under the pivot 32 and also functions as a cross member of the center frames 30, 30. One end of a rod 75 is rotatably joined to this rod-bracket 33, and the other end of the rod 75 is joined to a joint member 76 to which the lower end of a rear cushion 80 is joined. In other words, this rod 75 controls the movement of the joint member 76 in rotating directions about a joint pivot of the joint member 76 with the swing arm 71.

The engine 4 includes a crank case 5, a cylinder block 6 extending substantially upward from a front portion of the crank case 5, and a cylinder head 7 joined to an upper portion of the cylinder block 6. The engine 4 is, for example, a single cylinder engine including a single cylinder in the cylinder block 6. A piston is reciprocatably housed inside the cylinder in the cylinder block 6. In addition, a crankshaft connected to the piston via a connecting rod and the output shaft 5A of the engine are supported in the crank case 5. Moreover, in the crank case 5, also housed are a clutch mechanism, a gear change mechanism and the like constituting a power transmission mechanism between this crankshaft and the output shaft 5A.

An air intake/exhaust valve is provided in the cylinder head 7, and opens and closes an air intake/exhaust path that communicates with the cylinder in the cylinder block 6. An air intake port 7A of this air intake/exhaust path is formed in the rear face of the cylinder head 7. A throttle body 8 is connected to this air intake port 7A, and an air cleaner box 9 is connected to this throttle body 8.

An air exhaust port 7B of the air intake/exhaust path is formed in the front face of the cylinder head 7. An air exhaust pipe is connected to this air exhaust port 7B. This air exhaust pipe 50 is extended forward from the air exhaust port 7B, is bent to the right side of the cylinder head 7, and then is extended to the rear side of the vehicle body. The extended end of the air exhaust pipe 50 is connected to an exhaust muffler 51. In addition, a fuel tank 56 is arranged above the cylinder head 7 and in front of the seat 57.

Moreover, a number plate background 66 is provided in front of the head pipe 3. This number plate background is attached so as to cover a bottom bridge 62A (particularly, the mounting portions of the bottom bridge 62A and the front fender 65) and a steering damper 67, which will be described in detail.

Figure 2:
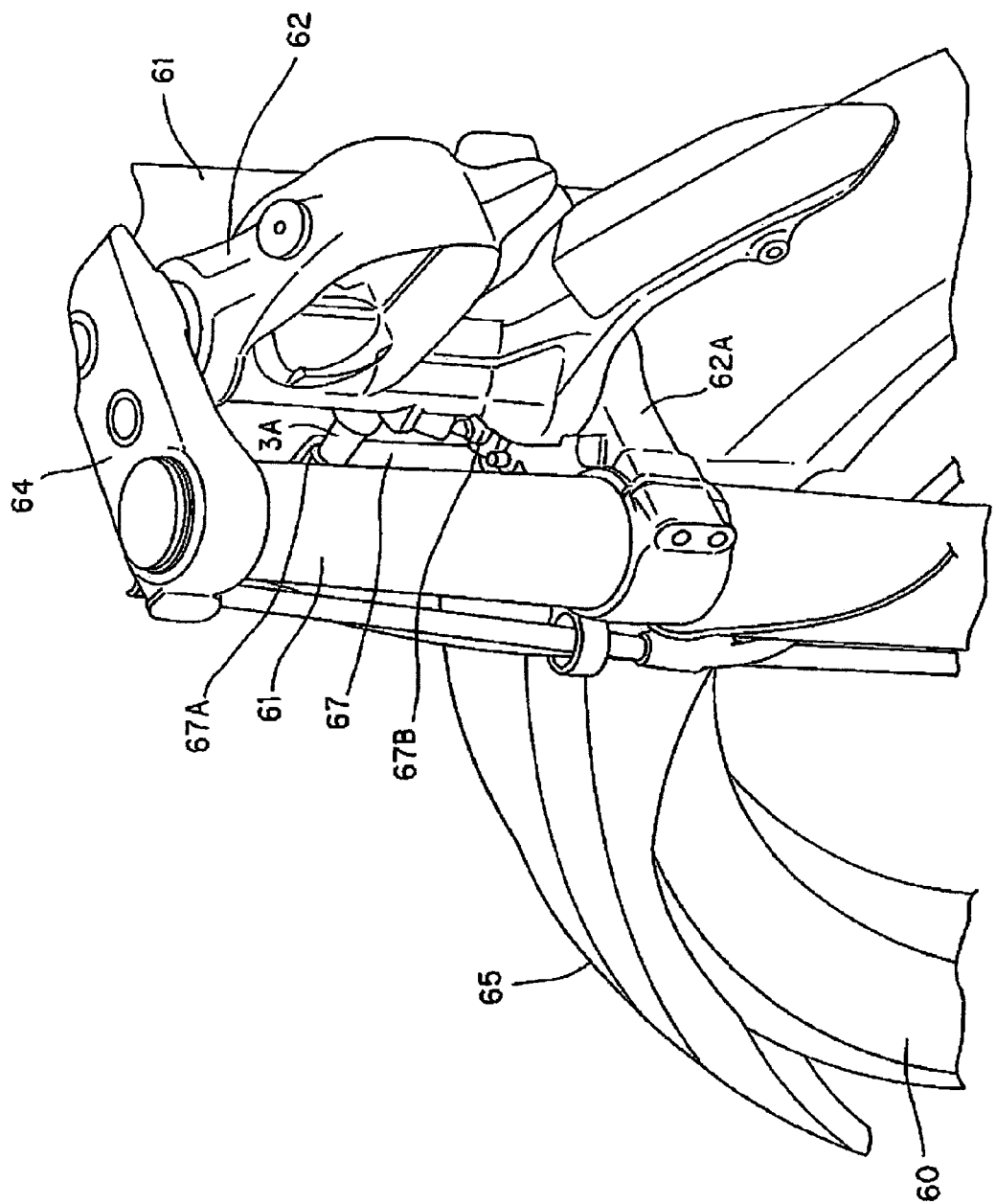
FIG. 2 is a perspective view of the mounting portion of a front fender of FIG. 1 when obliquely viewed from a rear and left side.
Figure 3:
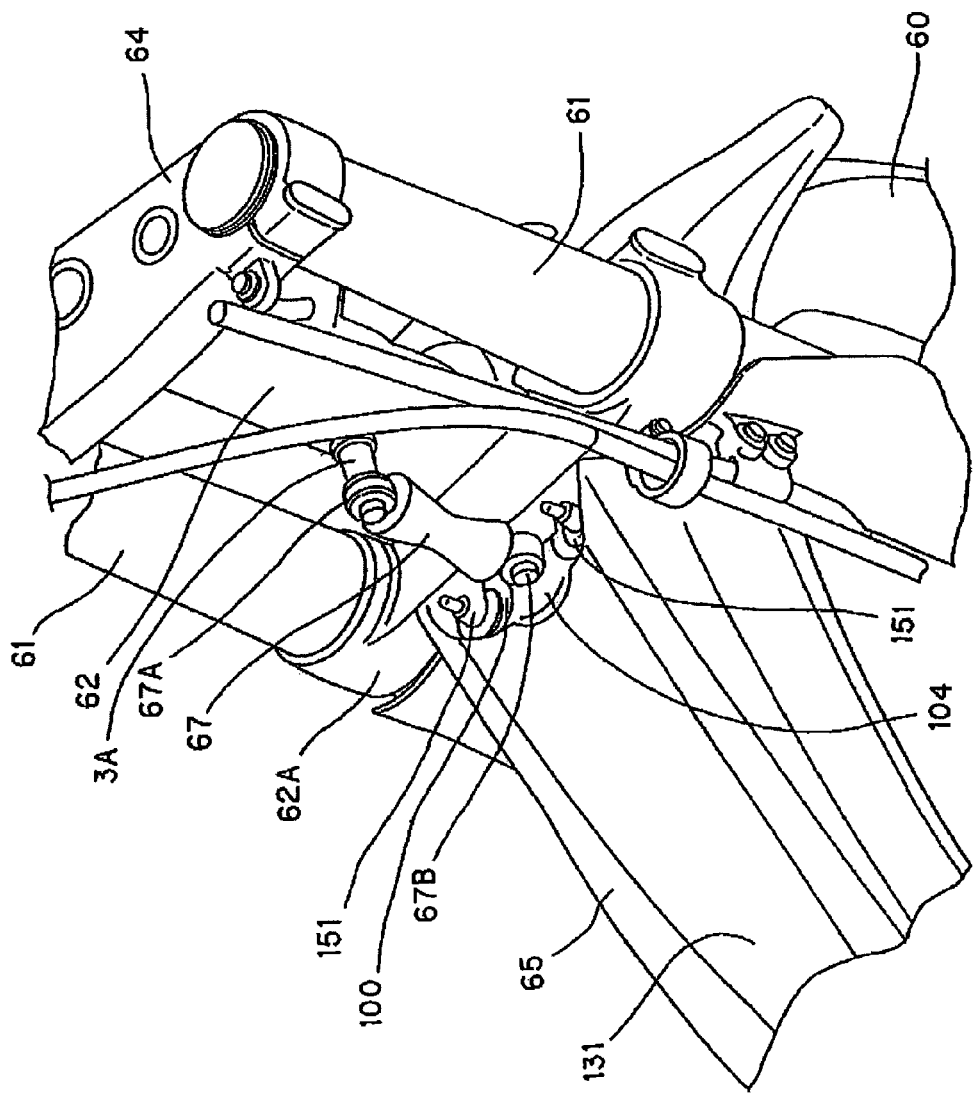
FIG. 3 is a perspective view of a mounting portion of FIG. 2 when obliquely viewed from a front and left side.

FIG. 2 shows a perspective view of the mounting portion of the front fender 65 in FIG. 1 when obliquely viewed from a rear and left side. Moreover, FIG. 3 shows a perspective view of the mounting portion in FIG. 2 when obliquely viewed from a front and left side. Incidentally, in FIG. 3, omitted are the components, such as the main frames 10, 10 and the down tube 20A, which are attached to the vehicle body behind the head pipe 3. Moreover, in order to simplify the description, the number plate background 66 is also omitted.

A steering stem 62 is rotatably inserted through the head pipe 3, and supports a pair of right and left front forks 61 that support the front wheel 60 via a shaft. A top bridge 64 is joined to the upper end of this steering stem 62, and a handlebar 63 is fixed to the top bridge 64. In addition, the front fender 65 is attached to the lower side of the bottom bridge 62A of the steering stem 62.

Moreover, a steering damper 67 for improving the handling performance of the handlebar 63 is provided in front of the head pipe 3 and above the front fender 65. In this steering damper 67, as shown in FIG. 3, an upper end portion 67A is fixed to a mounting portion 3A extending forward from the head pipe, while a lower end portion 67B is fixed to a front end face portion 62B of the bottom bridge 62A. For example, when the handlebar 63 is rotated from side to side, the lower end portion 67B of the steering damper 67 is also rotated together with the handlebar 63. Thus, the steering damper 67 is stretched and twisted between the upper end portion 67A and the lower end portion 67B. This steering damper 67 is used to enhance the stability of the handlebar 63 in driving.

Figure 4:
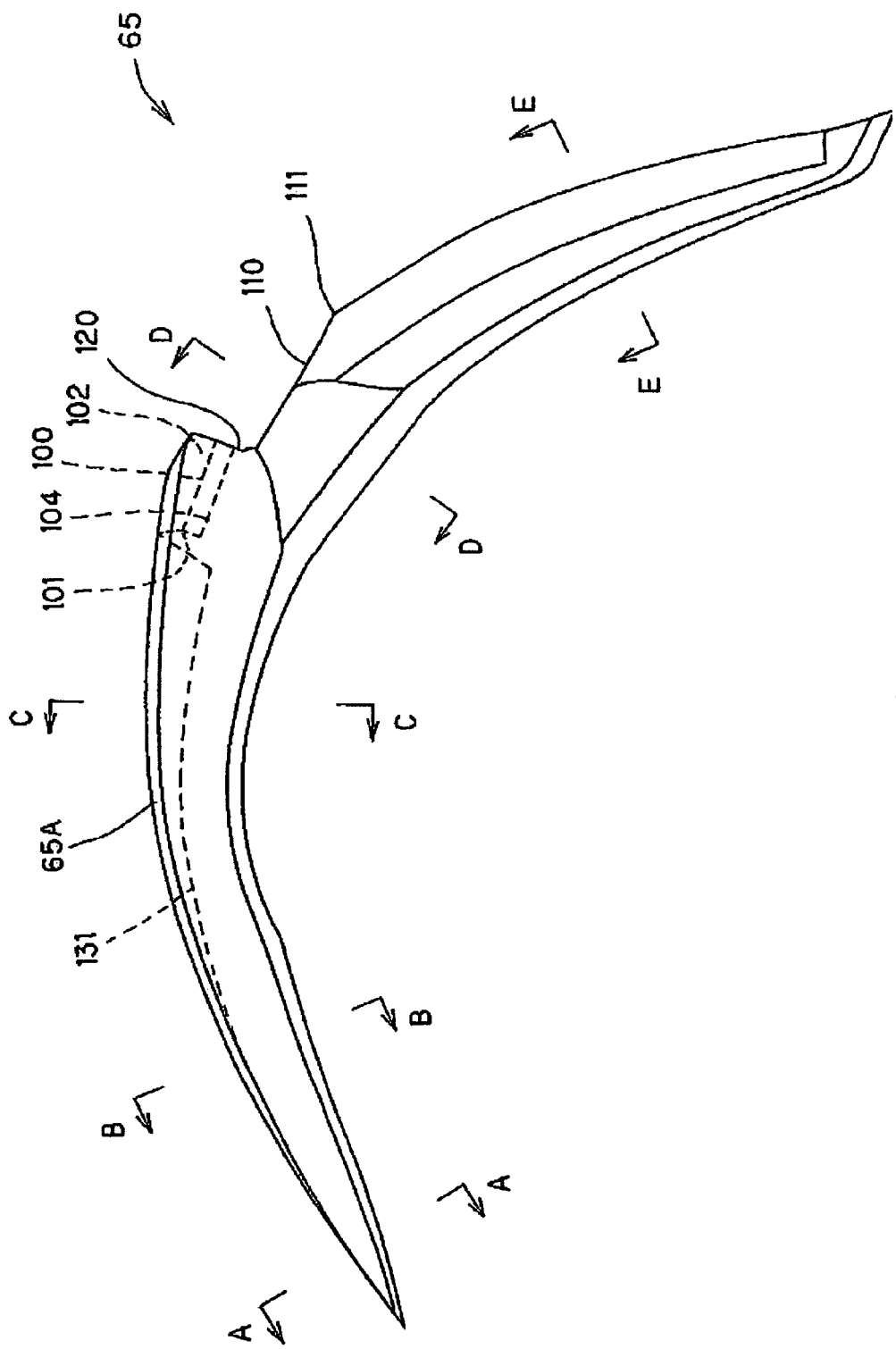
FIG. 4 is a side view showing only the front fender.
Figure 5:
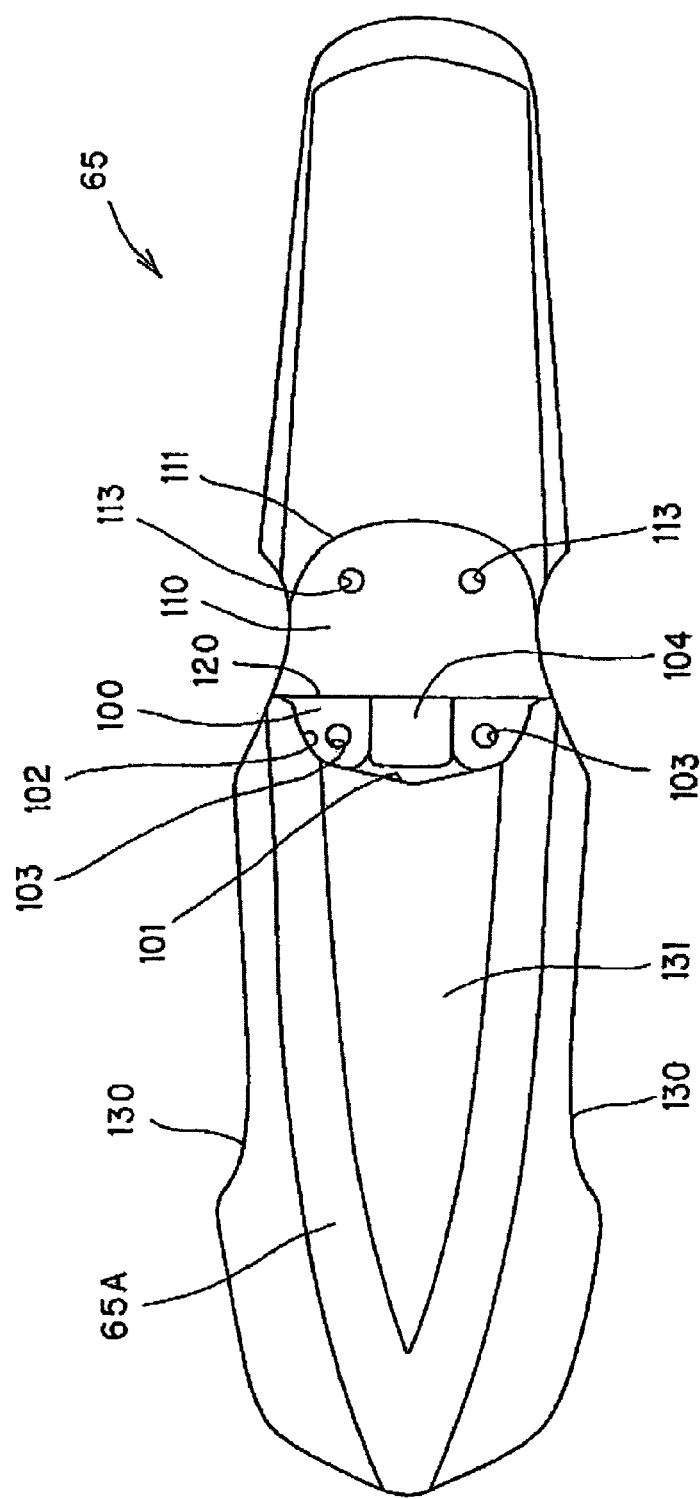
FIG. 5 is a plan view of the front fender in FIG. 4 when viewed from an upper side.

Hereinafter, the front fender 65 will be described in detail. FIG. 4 is a side view of the front fender 65, and FIG. 5 is a plan view of the front fender 65 in FIG. 4 when viewed from an upper side. In addition, FIGS. 6A to 6E show cross sections A-A to E-E, respectively, shown in FIG. 4 while omitting the right sides of the center lines.

As shown in FIG. 4, the front fender 65 is formed as a whole in an arc shape along the shape of the front wheel, and has a shape that tapers towards both end portions. In addition, the cross sectional shape of the front fender 65 has a bowl shape open at a lower portion as shown in FIGS. 6A to 6E.

Mounting surfaces 100 and 110 for mounting the front fender 65 on the bottom bridge 62A are formed in this front fender 65. As shown in FIGS. 4 and 5, these mounting surfaces 100 and 110 are disposed at different levels so that the mounting surfaces 100 and 110 can respectively be disposed as an upper surface and a lower surface which are formed stepwise. Then, a step face 120 extending in a substantially upper and lower direction is formed between the mounting surfaces 100 and 110.

The mounting surface 100 forwardly extends from the step face into a substantially half-circle shape when viewed from the upper side, as shown in FIG. 5. As shown in FIGS. 4 and 5, a vertical wall portion 102 is formed at an edge portion 101 of this substantially half-circle shape, and extends to a surface portion 65A of the front fender 65 located at an upper side of the edge portion 101. The front, right and left sides of the mounting surface 100 are partially surrounded by this vertical wall portion 102. In addition, as shown in FIG. 5, two mounting holes 103, 103 are formed in the mounting surface 100, being spaced apart from each other in a width direction. A groove portion 104 is formed between the mounting holes 103, 103 by recessing the mounting surface 100 downward. Incidentally, the mounting surfaces in the two mounting holes 103, 103 are formed in the same plane.

On the other hand, the mounting surface 110 rearwardly extends from the step face 120 into a substantially half-circle shape when viewed from the upper side, as shown in FIG. 5. As shown in FIGS. 4 and 5, the surface portion 65A of the front fender 65 extends downward from an edge portion 111 of this substantially half-circle shape. Moreover, two mounting holes 113, 113 are formed in the mounting surface 110, being spaced apart from each other in the width direction.

Figure 6A:
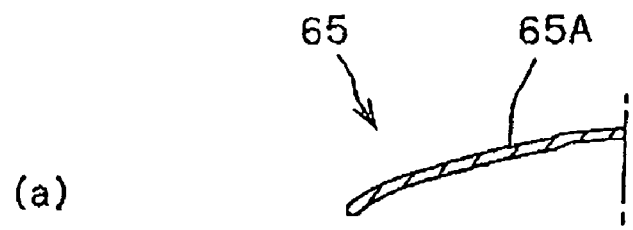
FIGS. 6A, 6B, 6C, 6D and 6E are cross-sectional views of the front fender taken along the lines A-A, B-B, C-C, D-D and E-E, respectively, in FIG. 4.
Figure 6B:
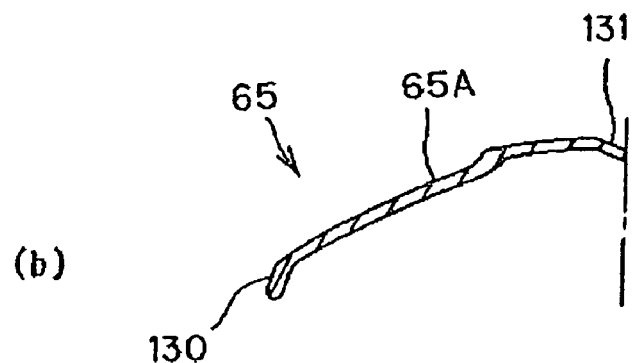

In addition, as shown in FIGS. 6A to 6E, in the cross sectional shape of the front fender 65, the length in a width direction of front fender 65 increases from the front edge portion (see FIG. 6A) toward the mounting surface 110 (see FIGS. 6B and 5), and a wall portion 130 extending substantially downward is formed at a side edge portion. Moreover, as shown in FIG. 6B, a recessed portion 131 recessed downward is formed at a center portion of the surface portion 65A of the front fender 65.

Figure 6C:
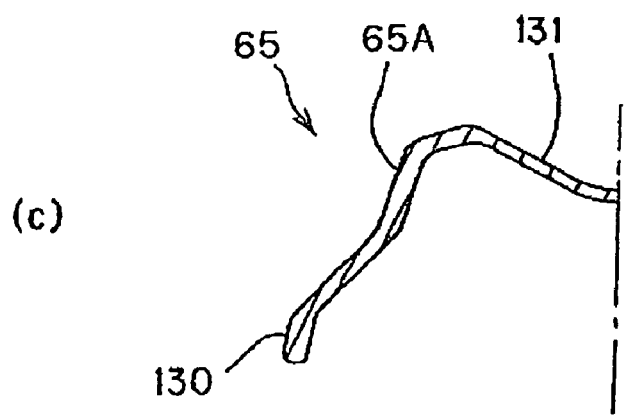

As shown in FIGS. 5 and 6C, the length in the width direction of a part of the front fender 65 in FIG. 6C is formed to be slightly smaller than that of a part shown in FIG. 6B. Moreover, as shown in FIG. 6C, the recessed portion 131 is formed so that a part of the recessed portion 131 closer to the mounting surface 100 will be larger in total size. With this configuration, the cross-section modulus around the mounting surface 100 is increased, and accordingly the bending strength is improved.

Figure 6D:
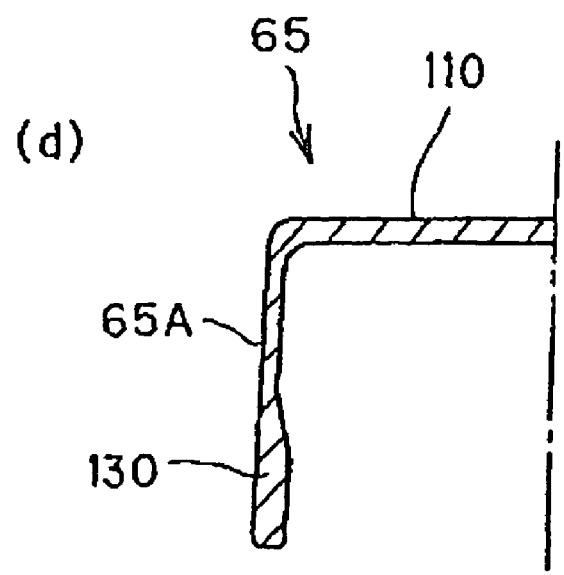

In addition, as shown in FIG. 6D, the cross sectional shape of a part of the mounting surface 110 is formed in a squared-U shape open at the lower side, and the wall portion 130 extends downward at a substantially right angle from each side edge of the mounting surface 110. The width dimension of this part of the mounting surface 110 is formed to be smaller than the width dimension of a front part of the mounting surface 100 as shown in FIG. 5. Thereby, the front fender 65 is prevented from interfering with the front forks 61 located at both sides of the front fender 65 when the front fender 65 is attached to the bottom bridge 62A. A lower part of this wall portion 130 is formed to be larger in thickness than an upper part thereof, as shown in FIG. 6D. With this configuration, the bending strength of this part of the mounting surface 110 is improved.

Figure 6E:
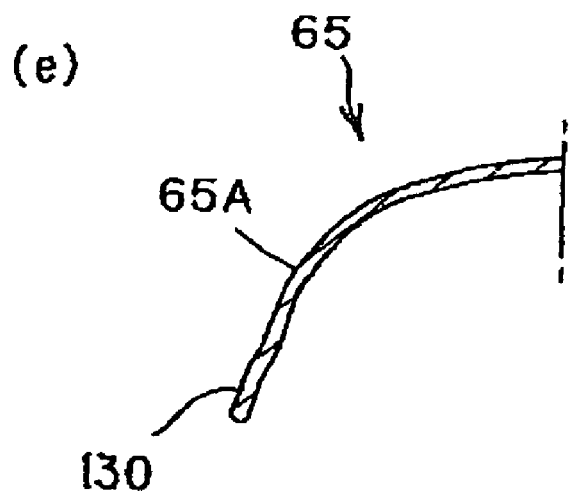

Furthermore, as shown in FIG. 6E, the cross sectional shape of a part behind the mounting surface 110 is formed in an inverted bowl shape having a curve that becomes gentler and gentler toward the rear edge thereof. In addition, the width dimension thereof is formed to be larger than that of the part at the mounting surface 110, as shown in FIG. 5.

Figure 7A:
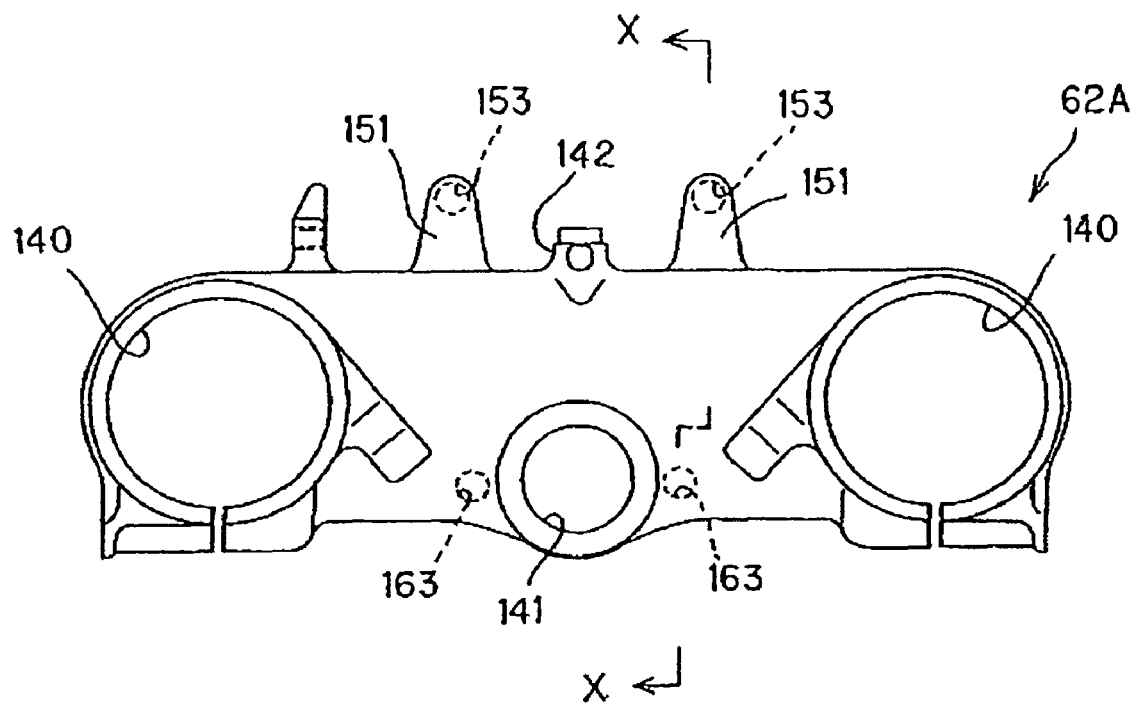
FIG. 7A is a plan view of a bottom bridge when viewed from an upper side of the vehicle body.
Figure 7B:
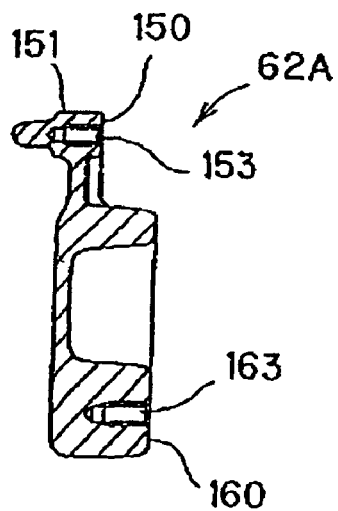
FIG. 7B is a cross-sectional view of the bottom bridge taken along the line X-X in FIG. 7A.

Hereinafter, the bottom bridge 62A to which the front fender 65 is attached will be described in detail. FIG. 7A is a plan view of the bottom bridge 62A when viewed from the upper side of the vehicle body. FIG. 7B is a cross section view of the bottom bridge 62A taken along the line X-X in FIG. 7A.

The bottom bridge 62A is integrally formed by casting or the like, and includes through holes 140, 140 on the right and left sides of the bottom bridge 62A, and a through hole 141 on the central lower side thereof. The front forks 61 are inserted through the through holes 140, 140, and a shaft (not illustrated) of the steering stem 62 is inserted through the through hole 141.

In addition, as shown in FIG. 7B, mounting surfaces 150 and 160 to be in contact with the mounting surfaces 100 and 110 of the front fender 65 are formed on this bottom bridge 62A.

As shown in FIGS. 7A and 7B, the mounting surfaces 150, 150 are formed in two jutting portions 151, 151 that jut from the main body of the bottom bridge 62A toward the front side of the vehicle body. In addition, in these mounting surfaces 150, 150, mounting holes 153, 153 are formed in positions corresponding to the mounting holes 103, 103 of the front fender 65, respectively. Each mounting hole 153, 153 is processed to have a female screw which is engageable with a fastener member such as a screw.

In the mounting surface 160, mounting holes 163, 163 are formed in positions corresponding to the mounting holes 113, 113 of the front fender 65. Each of the mounting holes 163, 163 is processed to have a female screw which is engageable with a fastener member such as a screw. The dimension in height between the mounting surfaces 150 and 160 (the dimension of a level difference obtained by forming a step) is substantially equal to the dimension in height between the mounting surfaces 100 and 110 of the front fender 65.

Moreover, a mounting portion 142 to which the lower end portion 67B of the steering damper 67 is attached is formed between the two jutting portions 151, 151 of the bottom bridge 62A.

A state where the front fender 65 is mounted on the bottom bridge 62A is described by using FIG. 3. The bottom bridge 62A and the front fender 65 are fitted together so that the mounting surface 150 of the jutting portions 151, 151 can be in contact with the mounting surface 100 of the front fender 65. Then, the bottom bridge 62A and the front fender 65 are fixed to each other by engaging fastener members such as screws inserted from the front fender 65 through the mounting holes 153, 153 of the bottom bridge 62A. On the other hand, the mounting surface 160 of the bottom bridge 62A and the mounting surface 110 of the front fender 65 are similarly fitted so as to be in contact with each other, and are fixed to each other with fastener members (not illustrated) such as screws inserted from under the front fender 65.

Moreover, as shown in FIG. 3, the lower end portion 67B of the steering damper 67 is disposed on the position of the groove portion 104 formed in the mounting surface 100 of the front fender 65.

Figure 8:
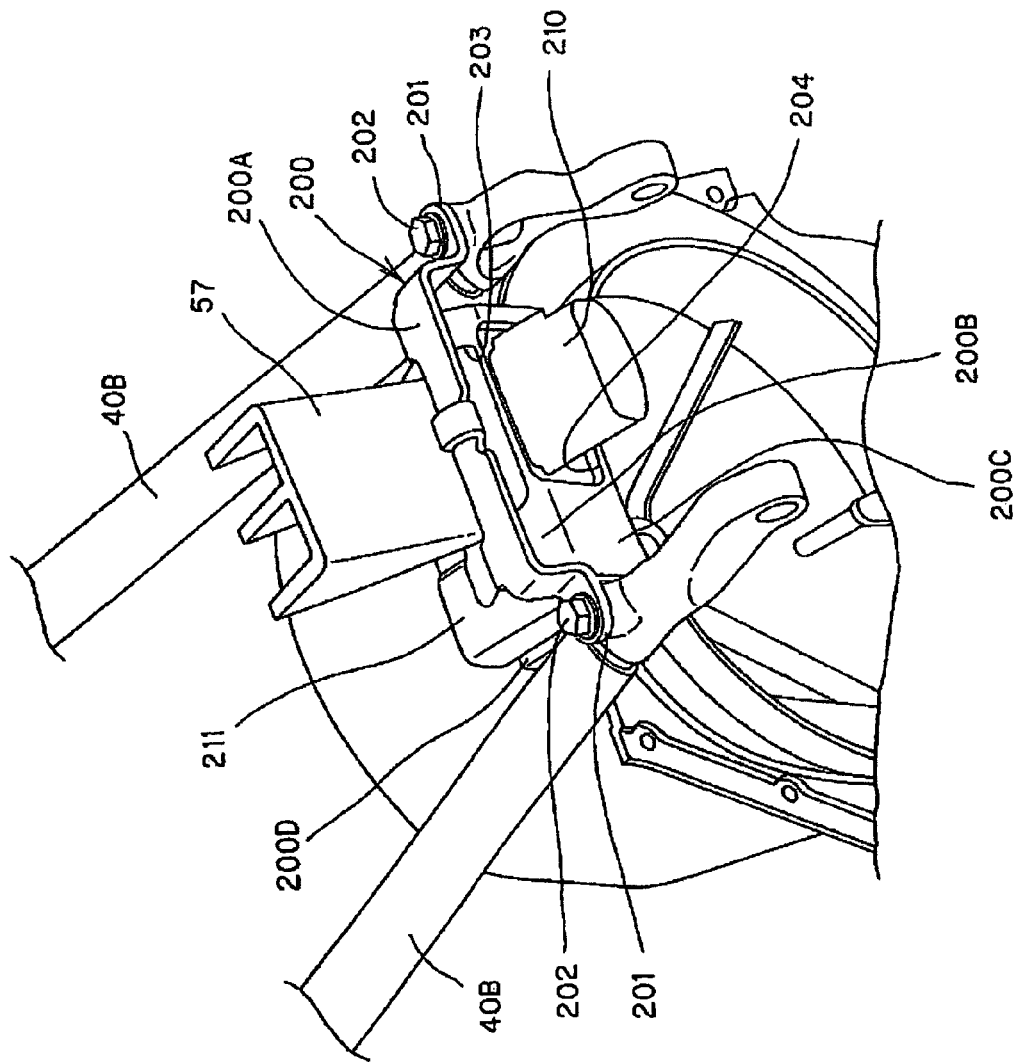
FIG. 8 is a perspective view showing a state of the FI-ECU when obliquely viewed from a front, right and upper side.

Next, by using FIGS. 8 and 9, description will be given for an attachment structure of an FI-ECU (engine control unit) that is attached to the present two-wheeled motor vehicle. FIG. 8 is a perspective view showing a state of the FI-ECU when obliquely viewed from a front, right and upper side. In addition, FIG. 9 is a perspective view showing a state of the FI-ECU when obliquely viewed from a rear and upper side.

An ECU 210 is attached with a bracket 200 to edge portions of the two pipes 40B, 40B of the rear frame 40. As shown in FIGS. 8 and 9, this bracket 200 includes an attachment portion 200A, a wall portion 200B, an inclined wall portion 200C and an ECU attachment portion 200D. The attachment portion 200A has a substantially horizontal plane. The wall portion 200B extends downward from the rear end of the attachment portion 200A. The inclined wall portion 200C obliquely extends rearward and downward from the lower end of the wall portion 200B. The ECU attachment portion 200D obliquely extends rearward and upward from the lower end of the inclined wall portion 200C.

Figure 9:
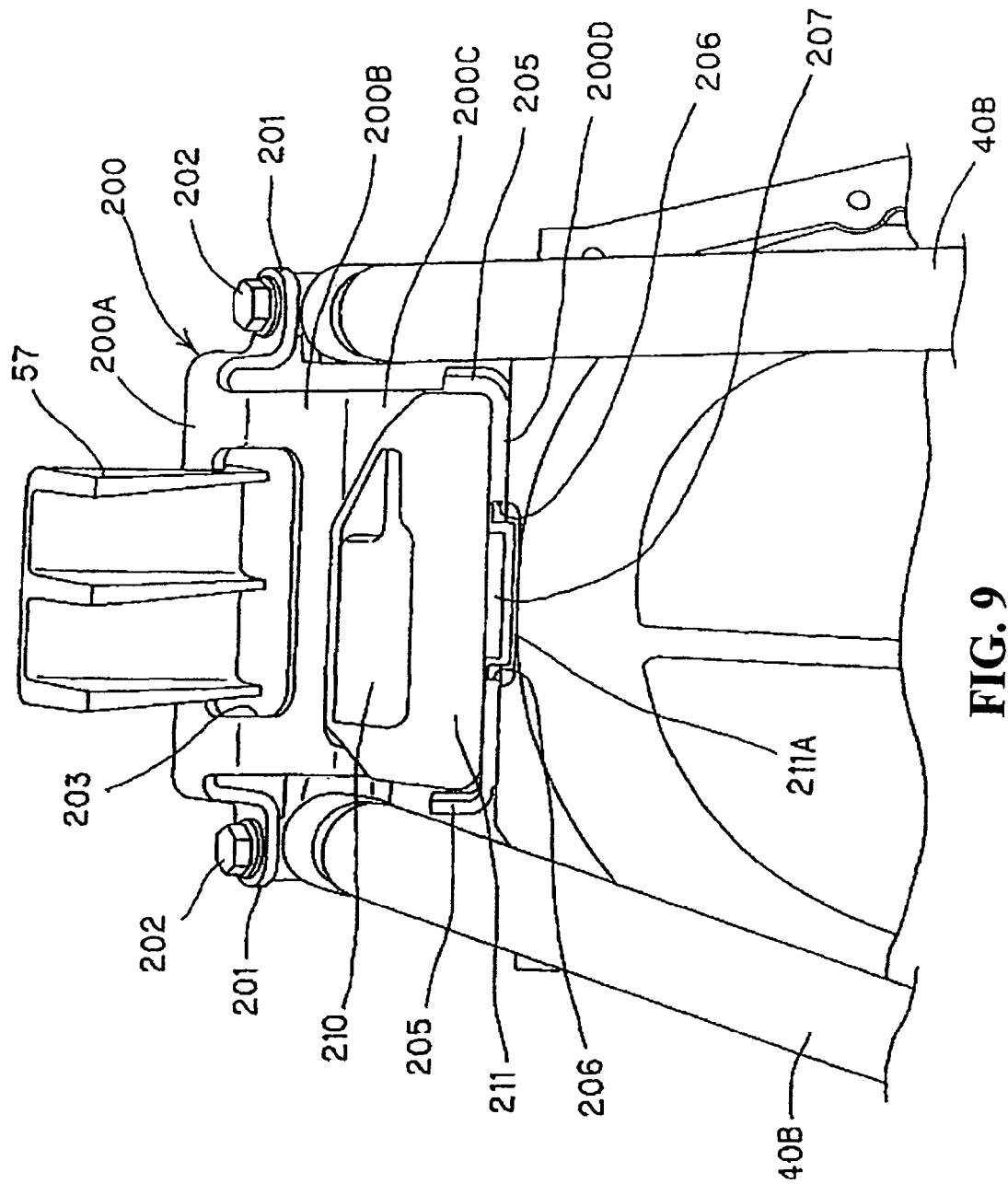
FIG. 9 is a perspective view showing a state of the FI-ECU when obliquely viewed from a rear and upper side.

As shown in FIGS. 8 and 9, fixing portions 201, 201 bent toward the pipes 40B on both sides are provided on both sides of the attachment portion 200A. With fastener members 202, 202 such as bolts, these fixing portions 201, 201 are attached to attachment portions provided on the upper sides of the pipes 40B, 40B.

Moreover, a hole portion 203 is formed in the center on the upper side of the wall portion 200B. The seat 57 is mounted by inserting a bottom plate of the seat 57 into this hole portion 203, and then by hooking the bottom plate onto the attachment portion 200A.

As shown in FIG. 8, an opening portion 204 for allowing the mounted ECU 210 to jut forward is formed in the inclined wall portion 200C.

In addition, as shown in FIG. 9, both ends of the ECU attachment portion 200D in a width direction are bent upward to be fitted to the external dimensions of the ECU 210, and thereby positioning portions 205, 205 are formed on both ends of the ECU attachment portion 200D in the width direction. Moreover, the ECU attachment portion 200D is provided with two notch portions 206, 206 that extend from the rear end of the ECU attachment portion 200D toward the inclined wall portion 200C. In addition, a hook portion 207 is formed between these notch portions 206, 206.

The outer side of the ECU 210 is covered with an elastic rubber 211, so that vibrations transmitted from the vehicle body to the ECU 210 are reduced. Moreover, a hooked portion 211A to be hooked on the hook portion 207 is provided in a lower portion of this rubber 211. By hooking this hooked portion 211A on the hook portion 207, the ECU 210 can be attached to the bracket 200 by use of the elasticity of the rubber 211 without use of any fastener member.

In the fender supporting structure of the two-wheeled motor vehicle according to the embodiment of the present invention, the two mounting surfaces 100 and 110 at different levels in height are formed in the front fender 65. Thereby, the strength of the part that is the mounting surface 100 and 110 of the front fender 65 is increased.

Moreover, the two mounting surfaces 100 and 110 at different levels in height are formed in the front fender 65, and two types of mounting surfaces 150 and 160 are also formed in the bottom bridge 62A. The mounting surfaces 150 and 160 are at different levels in height and come into surface contact with the mounting surfaces 100 and 110, respectively. Then, the front fender 65 is joined to the bottom bridge 62A by fixing these mounting surfaces 100 and 110 to the mounting surfaces 150 and 160, respectively, with the faster members such as screws. Accordingly, the supporting rigidity of the mounting support portion of the front fender 65 can be increased because the distance between the joint portions of the mounting surfaces 100 and 110 can be made longer.

Further, the vertical wall portion 102 extending to the surface portion 65A of the front fender 65 is formed around the mounting surface 100. This configuration makes it possible to increase the cross-section modulus of a part in which the mounting surface 100 is formed, and thereby to secure the rigidity of this part.

Furthermore, the groove portion 104 allowing the lower end portion 67B of the steering damper 67 to be arranged therein is formed on the mounting surface 100. For this reason, the rigidity can be secured by increasing the cross-section modulus, similarly.

Meanwhile, the number plate background 66 for concealing the bottom bridge 62A is provided in front of the head pipe 3. Accordingly, the mounting portions of the bottom bridge 62A and the front fender 65, and the steering damper 67 can be concealed by this number plate background. This configuration allows the appearance of the two-wheeled motor vehicle to be more attractive.

The jutting portions 151, 151 are formed in the front face of the bottom bridge 62A, and the mounting surface 150, 150 are formed in these jutting portions 151, 151. Then, the mounting surface of the fender is supported by these mounting surfaces 150, 150. Accordingly, the mounting surface 150 at a different level in height as compared to the mounting surface 160 can be formed without any change in the shape of the bottom bridge 62A. Thus, the mounting surface 100 of the front fender 65 can be supported by the mounting surface 150.

Hereinabove, the preferred embodiment for carrying out the present invention has been described. However, the present invention is not limited to the foregoing embodiment, and various modifications and variations of the embodiment can be made.

Although this embodiment has been described for the configuration in which the front fender 65 is mounted on the bottom bridge 62A, another embodiment can be configured by providing an additional supporting member apart from the bottom bridge 62A.

Moreover, although the mounting portions of the front fender 65 and the bottom bridge 62A are concealed by the number plate background 66, the mounting portions may be concealed by another covering member (for example, a shroud).

In addition, in this embodiment, the mounting surfaces 100 and 110 (and the mounting surfaces 150 and 160) are formed at different levels in height in a front and rear direction of the vehicle body. However, the mounting surfaces may be formed at different levels in height in a width direction of the vehicle body.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A fender supporting structure of a two-wheeled motor vehicle, comprising:
   a fender formed in an arc shape along a shape of a wheel; and
   a bottom bridge attached to a front fork of the two-wheeled motor vehicle, said fender being mounted on said bottom bridge from under the bottom bridge,
   wherein at least two fender mounting surfaces are formed on said fender at different levels in height of said fender with a step face therebetween, said step face being formed in said fender,
   wherein at least two bottom bridge mounting surfaces are formed on said bottom bridge at different levels in height of said bottom bridge, and
   wherein said fender is mounted to said bottom bridge by joining said at least two fender mounting surfaces and said at least two bottom bridge mounting surfaces.

2. The fender supporting structure of a two-wheeled motor vehicle according to claim 1, wherein said at least two fender mounting surfaces and said at least two bottom bridge mounting surfaces are disposed in different positions relative to a front and rear direction of the two-wheeled motor vehicle.

3. The fender supporting structure of a two-wheeled motor vehicle according to claim 1, wherein said bottom bridge is provided with a covering member for concealing said bottom bridge.

4. The fender supporting structure of a two-wheeled motor vehicle according to claim 2, wherein said bottom bridge is provided with a covering member for concealing said bottom bridge.

5. The fender supporting structure of a two-wheeled motor vehicle according to claim 2,
   wherein a front face of said bottom bridge is provided with a projecting portion, and
   wherein one of said fender mounting surfaces is supported by said projecting portion.

6. The fender supporting structure of a two-wheeled motor vehicle according to claim 3,
   wherein a front face of said bottom bridge is provided with a projecting portion, and
   wherein one of said fender mounting surfaces is supported by said projecting portion.

7. The fender supporting structure of a two-wheeled motor vehicle according to claim 4,
   wherein a front face of said bottom bridge is provided with a projecting portion, and
   wherein one of said fender mounting surfaces is supported by said projecting portion.

8. A fender supporting structure of a two-wheeled motor vehicle, comprising:
   a fender formed in an arc shape along a shape of a wheel; and
   a bottom bridge on which the fender is mounted from under the bottom bridge so as to cover an area above the wheel, said bottom bridge being attached to a front fork of the two-wheeled motor vehicle,
   wherein at least a first mounting surface and a second mounting surface at different levels in height are formed on the fender;
   wherein at least a first mounting surface and a second mounting surface at different levels in height are formed on the bottom bridge;
   wherein the first and second mounting surfaces of said fender join with the first and second mounting surfaces of the bottom bridge;
   wherein the first and second mounting surfaces of said fender are different in height in a front and rear direction of a vehicle body;
   wherein the first and second mounting surfaces of said bottom bridge are different in height in a front and rear direction of a vehicle body;
   wherein the first and second mounting surfaces of said fender are disposed as an upper surface and a lower surface, respectively, which are formed stepwise on the fender,
   wherein the first mounting surface of said fender forwardly extends from a stepface, between the first and second mounting surfaces, into a substantially half-circle shape, as viewed from an upper side;
   wherein a vertical wall portion is formed at an edge portion of the substantially half-circle shape which extends to a surface portion of the fender;
   wherein the vertical wall portion surrounds front, left and right sides of the first mounting surface of said fender; and
   wherein a groove portion is formed by recessing the first mounting surface of said fender downward.

9. The fender supporting structure of a two-wheeled motor vehicle according to claim 8, wherein the bottom bridge is provided with a covering member for concealing the bottom bridge.

10. The fender supporting structure of a two-wheeled motor vehicle according to claim 9,
    wherein a front face of the bottom bridge is provided with a jutting portion,
    wherein one of the first and second mounting surfaces of the fender is supported by the jutting portion of said bottom bridge, and
    wherein a dimension in height between the first and second mounting surfaces of the bottom bridge is substantially equal to a dimension in height between the first and second mounting surfaces of the fender.

* * * * *